(No Model.)
W. A. OBENCHAIN.
DIP NET.
No. 333,326. Patented Dec. 29, 1885.
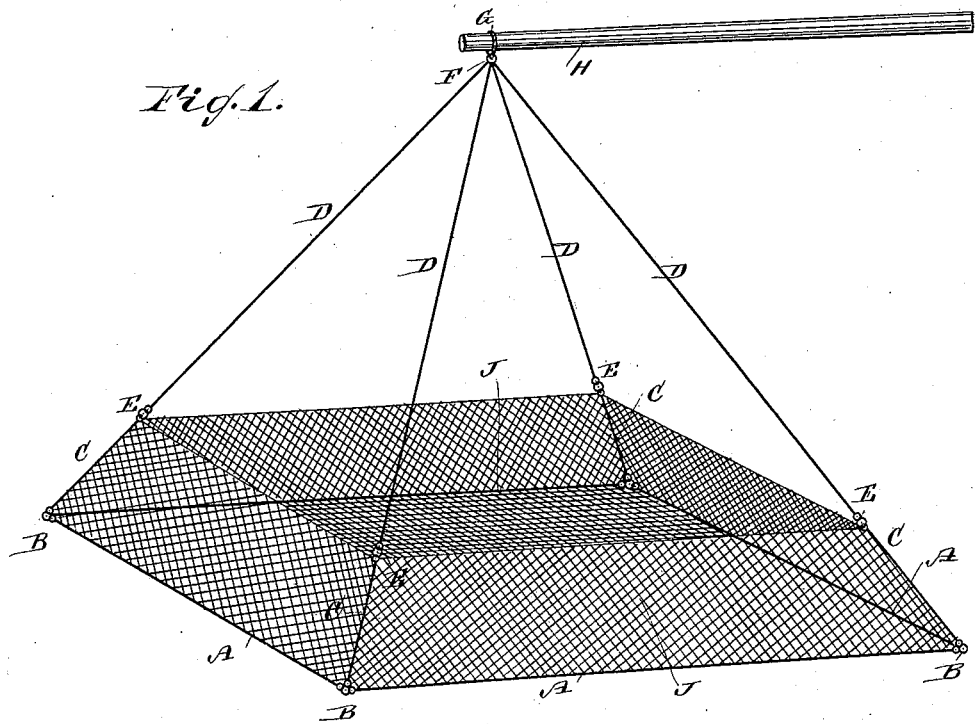
Fig. 1.
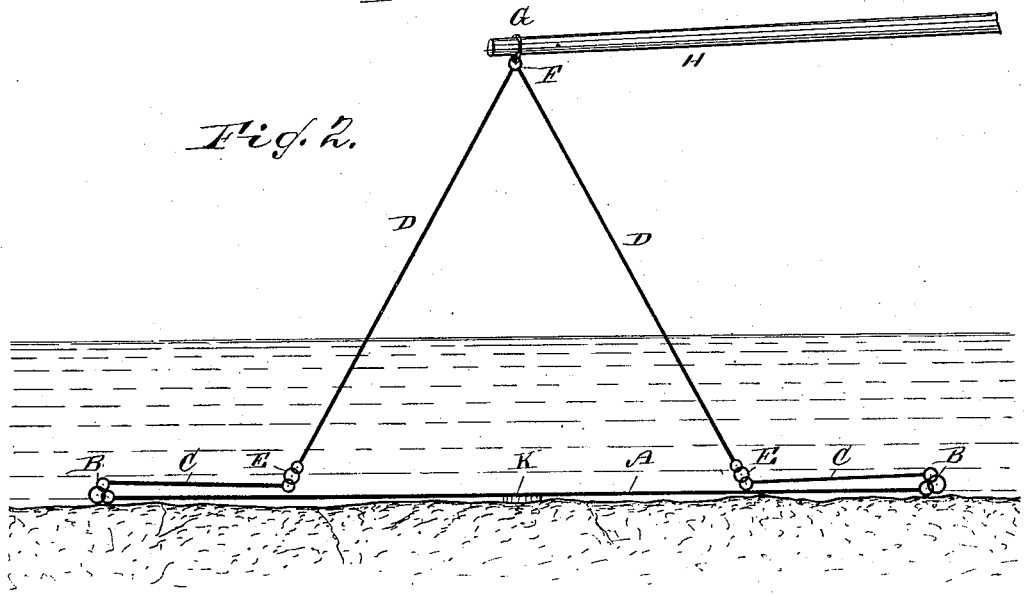
Fig. 2.
Fig. 3.
WITNESSES:
INVENTOR:
W. A. Obenchain
BY Munn & Co.
ATTORNEYS.

UNITED STATES PATENT OFFICE.

WILLIAM A. OBENCHAIN, OF BOWLING GREEN, KENTUCKY.

DIP-NET.

SPECIFICATION forming part of Letters Patent No. 333,326, dated December 29, 1885.

Application filed March 25, 1885. Serial No. 160,063. (No model.)

*To all whom it may concern:*

Be it known that I, WILLIAM A. OBENCHAIN, of Bowling Green, Warren county, Kentucky, have invented a new and Improved Dip-Net, of which the following is a full, clear, and exact description.

The object of my invention is to provide a new and improved dip-net for catching minnows, which net is so constructed that it adjusts itself automatically when resting on the bottom of the brook or stream and when being raised, and can be folded very compactly, when not in use, for transportation and storage.

The invention consists of a net formed of four rods united at the ends by joints, netting secured to the said rods, suspension-rods having link-joints, and netting secured to the lower parts of the suspension-rods.

Reference is to be had to the accompanying drawings, forming part of this specification, in which similar letters of reference indicate corresponding parts in all the figures.

Figure 1 is a perspective view of my improved dip-net while being raised. Fig. 2 is a longitudinal sectional elevation of the same on the bottom of the brook. Fig. 3 is a sectional view of the link-joint.

A square or oblong frame is formed of four wires or rods, A, united at the ends by ring or link joints B. The frame is suspended at the ends by wires C D, united by link-joints E, the lower ends of the wires C being jointed to the corners of the frame, and the upper ends of the wires D being provided with rings F, which are united by a rope or other loop, G, through which the end of the pole H is passed for raising and lowering the net. Fine netting J is secured to the wires A, forming the frame, and forms the bottom of the net, and the sides of the net are formed of like netting J, secured to the wires C and to the rods or wires A. A weight, K, and suitable bait are secured to the middle of the netting bottom.

The net is lowered upon the bottom of the brook or stream, the netting sides folding upon the netting bottom, as shown in Fig. 2. The minnows can then swim along the bottom of the brook and over the net. When the net is raised, the netting sides swing up, as shown in Fig. 1, and thus prevent the escape of the minnows.

When not in use, the net can be folded very compactly by first detaching the pole, and disuniting the ends of the rods or wires at F.

I am aware of the existence of a dip-net with its bottom net-supporting frame connected directly to the suspending crossing ropes or bails, and of the existence of such a net with its frame composed of three sections, two sections being hinged or pivoted to the middle or bottom section, which former sections, when the net is open, present elevated sides, while, when the net is closed, they form, with the third or bottom section, a closed cage.

The advantage possessed by my invention or net over the foregoing is, as to the net first referred to, that the sides are elevated above the bottom net or frame as the same is raised or lifted through and out of the water, which prevents the possibility of the minnows or bait springing out of the net, while, as to the net last described, the net in its entirety is permitted to lie flat upon the bottom of the brook or other body of water in which it may be used, and when not in use it may be folded much more compactly for storage out of the way.

Having thus described my invention, I claim as new and desire to secure by Letters Patent—

1. The combination, with the rods A, united by joints at the ends, of netting secured to the rods, and suspension-rods having link-joints, substantially as herein shown and described.

2. The combination, with the rods A, of the netting J, the rods C, netting secured to the same, and the rods D, connected with the rods C by link-joints, substantially as herein shown and described.

3. The combination, with the rods A, of netting secured to the same, the rods C, netting secured to the same, the rods D, connected with the rods C by link-joints, the rings F on the upper ends of the rods D, and of the loop G, substantially as herein shown and described.

WILLIAM A. OBENCHAIN.

Witnesses:
JOHN E. YOUNGLOVE,
CHARLES W. KEMP.